US006435766B1

(12) United States Patent
Titford

(10) Patent No.: US 6,435,766 B1
(45) Date of Patent: Aug. 20, 2002

(54) METHOD AND APPARATUS FOR GROUND WORKING

(76) Inventor: Larry Titford, Box 1327, Rocky Mountain House, Alberta, T0M 1T0 (CA)

(*) Notice: Subject to any disclaimer, the term of this patent is extended or adjusted under 35 U.S.C. 154(b) by 0 days.

(21) Appl. No.: 09/648,654

(22) Filed: Aug. 25, 2000

(30) Foreign Application Priority Data

Aug. 27, 1999 (CA) ............................................. 2281162

(51) Int. Cl.⁷ .......................... E01C 19/26; B62D 61/06; B62K 15/00
(52) U.S. Cl. ........................... 404/75; 37/189; 172/554; 180/209; 180/211; 180/212; 280/43; 280/43.16; 280/491.2; 404/127
(58) Field of Search ............................. 404/75, 93, 94, 404/112, 122, 127, 128, 84.8; 180/20, 209, 211, 213, 212; 280/43, 43.14, 43.16, 491.2, 638; 37/189, 95; 172/554

(56) References Cited

U.S. PATENT DOCUMENTS

| 1,061,104 A | * | 5/1913 | Nett et al. ................... 381/399 |
| 1,265,098 A | * | 5/1918 | McKnight ................... 180/212 |
| 1,302,489 A | * | 4/1919 | Hollis ....................... 280/137.5 |
| 3,146,686 A | * | 9/1964 | Grace et al. ................ 280/638 |
| 3,247,771 A | * | 4/1966 | Hanson ..................... 404/84.8 |
| 3,899,037 A | * | 8/1975 | Yuker ........................ 180/6.48 |
| 4,084,522 A | * | 4/1978 | Younger ....................... 111/14 |
| 4,109,747 A | * | 8/1978 | Hornagold et al. ......... 180/140 |
| 4,157,877 A | * | 6/1979 | Lee ............................. 404/128 |
| 4,392,541 A | * | 7/1983 | Barchard .................... 180/209 |
| D281,634 S |   | 12/1985 | Pratt .......................... D32/16 |
| 4,579,181 A | * | 4/1986 | Jarret et al. ................. 180/6.5 |
| 4,970,800 A | * | 11/1990 | Takizawa et al. .......... 33/561.3 |
| 5,125,460 A | * | 6/1992 | Behrens ...................... 173/184 |
| 5,540,292 A | * | 7/1996 | Behrens ...................... 173/184 |
| 6,113,309 A | * | 9/2000 | Hollon et al. ............. 404/84.05 |
| 6,139,045 A | * | 10/2000 | Vandenbark et al. ........ 280/638 |
| 6,273,637 B1 | * | 8/2001 | Peterson ..................... 404/127 |

FOREIGN PATENT DOCUMENTS

| CA | 1080257 | 6/1980 | .................. 262/52 |
| CA | 1201287 | 3/1986 | .................... 37/18 |

* cited by examiner

Primary Examiner—Gary S. Hartmann
(74) Attorney, Agent, or Firm—Christensen O'Connor Johnson Kindness PLLC

(57) ABSTRACT

A method and apparatus for ground working. A first step involves providing an apparatus for ground working with telescopically extendible wheel supports which permit the height and angular orientation of the chassis to be adjusted to suit a contour of a ditch. A second step involves positioning the apparatus with at least one support wheel in the ditch and at least one support wheel on the road. A third step involves driving along the ditch broadcasting gravel from the ditch onto the road with the drum. Instead of hauling in replacement gravel from a remote site, gravel is reclaimed from the ditch and broadcast back onto the road.

2 Claims, 16 Drawing Sheets

METHOD AND APPARATUS FOR GROUND WORKING

FIELD OF THE INVENTION

The present invention relates to a method and an apparatus for ground working and, in particular, for use in grooming ditches.

BACKGROUND OF THE INVENTION

Canadian patent 1,201,287 discloses an apparatus for grooming roadside ditches entitled "Ditcher Head Assembly for Cleaning Ditches". The ditcher head assembly is a rotating head that can be mounted on a tractor to throw debris from a ditch onto a shoulder of a road.

Canadian patent 1,080,257 discloses an apparatus for grooming ditches entitled "Automated Machinery to Clean Debris from Roadside Ditches, Collect it, and then Transport the Debris to a Major Collection Area for Disposal". This automated machinery includes a self-dumping truck or trailer in which the debris is collected.

SUMMARY OF THE INVENTION

What is required is an alternate method and apparatus for ground working.

According to one aspect of the present invention there is provided an apparatus for ground working, which includes a chassis and at least three telescopically extendible wheel supports secured to the chassis. At least one support wheel is rotatably mounted to a remote end of each of the telescopically extendible wheel supports. The telescopically extendible wheel supports providing a means whereby the height and angular orientation of the chassis is adjustable to suit a contour of a ditch. A rotatably mounted drum is secured to and underlies the chassis.

The apparatus, as described above, is capable of moving along a road with either one wheel up on the road and two wheels in the ditch or two wheels up on the road and one wheel in the ditch. The telescopic wheel supports permit the height and angular of the chassis to be adjusted to provide sufficient clearance for the drum to operate. A three wheel vehicle is preferred, as there is more space between the wheels to broadcast gravel, as will hereinafter further described.

Although beneficial results may be obtained through the use of the apparatus, as described above, a chassis with a wide enough stance to be stable in a ditch will be too wide to drive down a highway or transport by flat bed trailer. Even more beneficial results may, therefore, be obtained when the chassis includes telescopically adjustable members extending between the at least three wheel supports. This permits the distance between the support wheels to be adjusted to provide for a transport mode.

Although beneficial results may be obtained through the use of the apparatus, as described above, it is difficult to configure a drive or steering system for such a vehicle. Even more beneficial results may, therefore, be obtained when the support wheel on each of the wheel supports has an individual drive motor, and preferably, independent steering.

Although beneficial results may be obtained through the use of the apparatus, as described above, in order to broadcast gravel in a desired direction onto the road, it is preferred that the drum is angularly adjustable. The preferred form of drum having radially projecting teeth.

According to another aspect of the present invention there is provided a method for ground working. A first step involves providing an apparatus for ground working, as described above, with telescopically extendible wheel supports which permit the height and angular orientation of the chassis to be adjusted to suit a contour of a ditch. A second step involves positioning the apparatus with at least one support wheel in a ditch. A third step involves driving along the ditch broadcasting gravel from the ditch onto the road with the drum.

On a gravel road, traffic tends, over time, to move gravel to the shoulders of the road. This gravel is eventually pushed over the shoulders and into the ditch. Over time, a considerable amount of gravel accumulates in the ditch. Instead of hauling in replacement gravel from a remote site, the teaching of the present invention is to reclaim gravel from the ditch and broadcast the gravel back onto the road.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
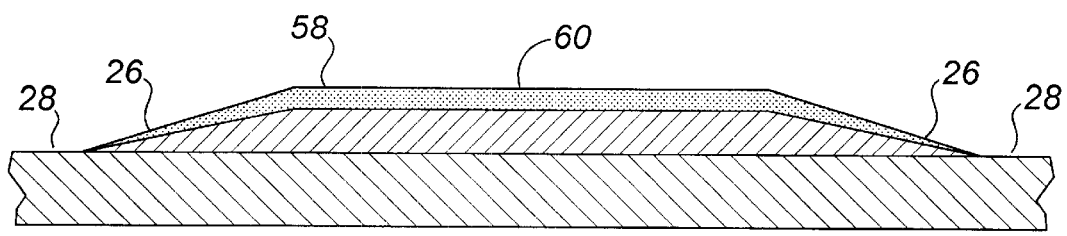
FIG. 1 is an end elevation view, in section, of a freshly gravel road.

The preferred embodiment, an apparatus for ground working generally identified by reference numeral 10, will now be described with reference to FIGS. 1 through 20.

Figure 3:
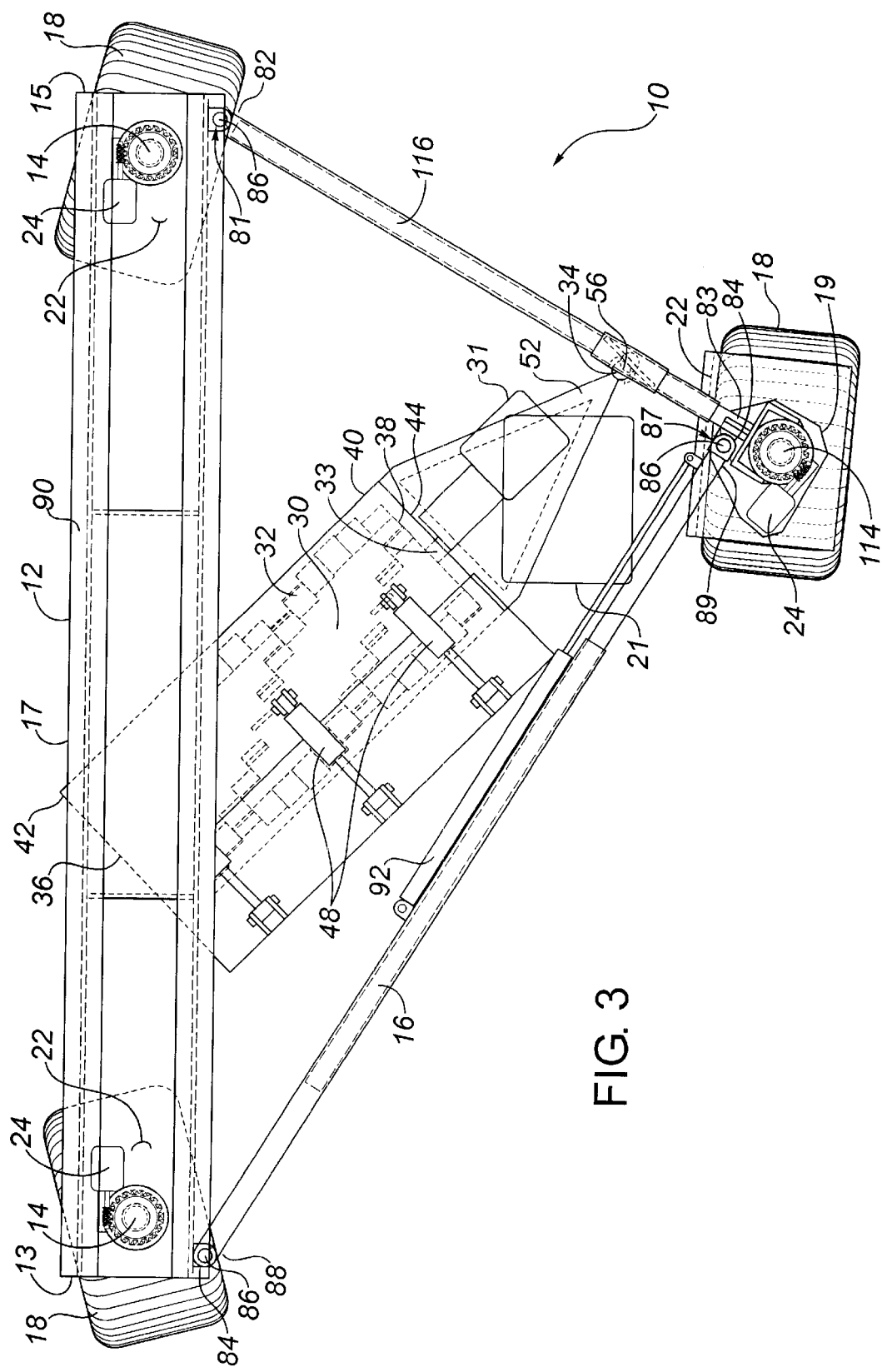
FIG. 3 is a top plan view of an apparatus for ground working constructed in accordance with the teachings of the present invention in an operative mode.

Referring to FIG. 3, apparatus 10 has a chassis 12 which is substantially triangular shape. Chassis 12 includes a main body 90, a first telescopically adjustable member 16 and a second telescopically adjustable member 116. Main body 90 has a first end 13, a second end 15. Chassis 12 has a base 17 defined by main body 90 and a movable apex 19. Moving of movable apex 19 permits apparatus to assume an operating position illustrated in FIG. 3 or a transport position illustrated in FIG. 7. Main body of chassis 12 has wheel supports 14 secured at first end 13 and second end 15. A further wheel support 114 is positioned at and forms part of movable apex 19. As can been seen by referring to FIGS. 4 and 5, and will be hereinafter further described, wheel supports 14 and 114 are telescopically extendible. A support wheel 18 is rotatably mounted to a remote end 20 of each of telescopically extendible wheel supports 14 and 114. First telescopically adjustable member 16 has a first end 88 and a second end 89. When apparatus 10 is in the operating position illustrated in FIG. 3, first end 88 of first telescopically adjustable member 16 is pivotally secured to first end 13 of main body 90 and second end 89 is detachably pivotally secured to wheel support 114 at movable apex 19 of chassis 12. When apparatus is in the transport position illustrated in FIG. 7, second end 89 of first telescopically adjustable member 16 is detached from wheel support 114 and is swung against main body 90. Referring to FIG. 3, second telescopically adjustable member 116 has a first end 82 and a second end 83. First end 82 of second telescopically adjustable member 116 is pivotally secured to second end 15 of main body 90 and second end 83 is pivotally secured to wheel support 114 at movable apex 19 of chassis 12.

Referring to FIG. 3, a length of each of first telescopically adjustable member 16 is controlled to assume a variety of operative position spacings. Movement of first telescopically adjustable member 16 serves to alter the distance between wheel support 14 at first end 13 of main body 90 and wheel support 114 at movable apex 19 of chassis 12. There are two ways telescopically adjustable member 16 may be extended. The manner illustrated is by a hydraulic piston 92. When each support wheel 18 at movable apex 19 has a drive motor and a steering motor 24, as will hereinafter be further described, the same result can be obtained by driving wheel support 114 at apex 19 ahead while steering support wheel 18 until wheel support 114 assumes the desired configuration. Bolts can then be inserted to maintain first telescopic member 16 in the desired telescopic position.

Figure 7:
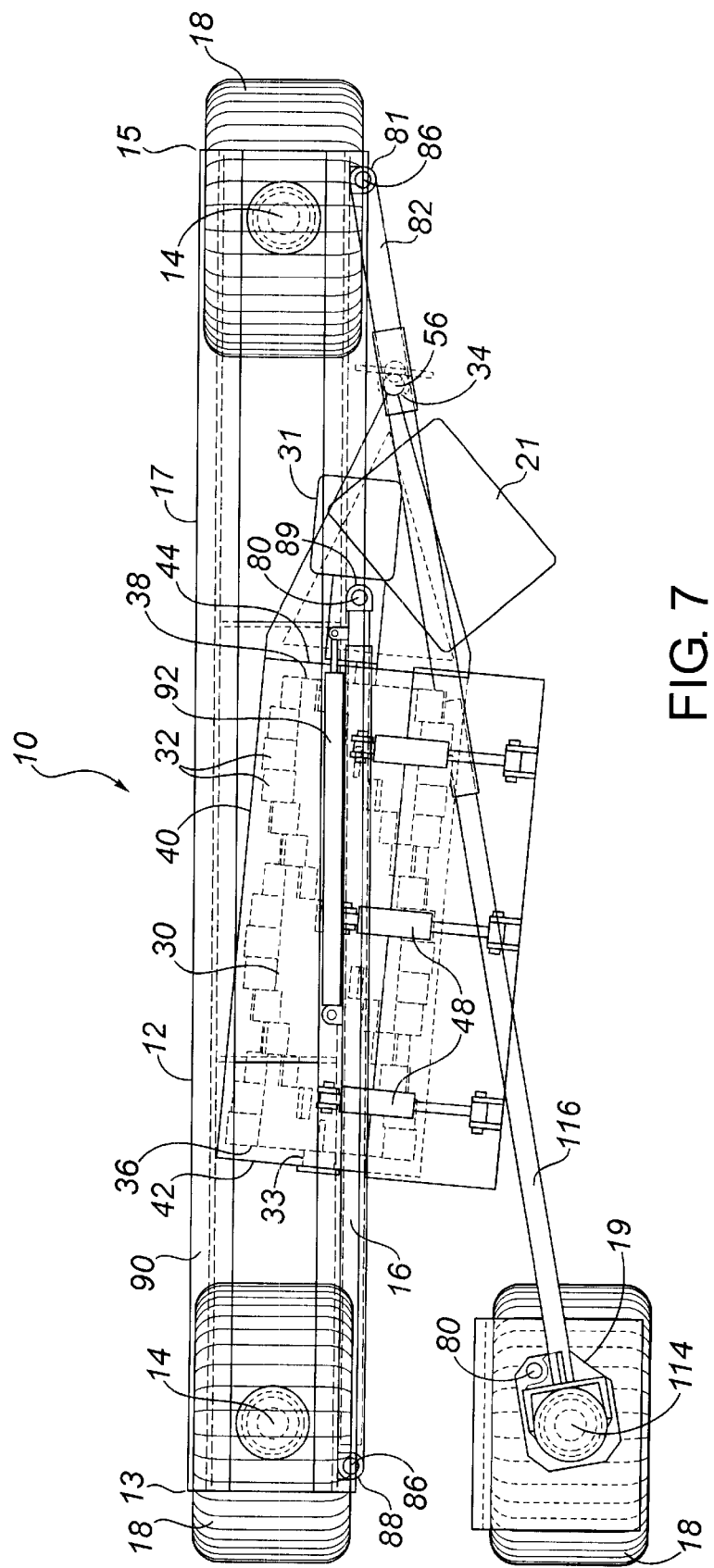
FIG. 7 is a top plan view of the ground working apparatus illustrated in FIG. 3, in a transport mode.

A length of second telescopically adjustable member 116 is maintained constant when in the operating position, but is extended to assume the transport position, as will hereinafter be further described in relation to FIG. 7. Movement of second telescopically adjustable member 116 serves to alter the distance between wheel support 14 at second end 15 of main body 90 and wheel support 114 at movable apex 19 of chassis 12.

Figure 8:
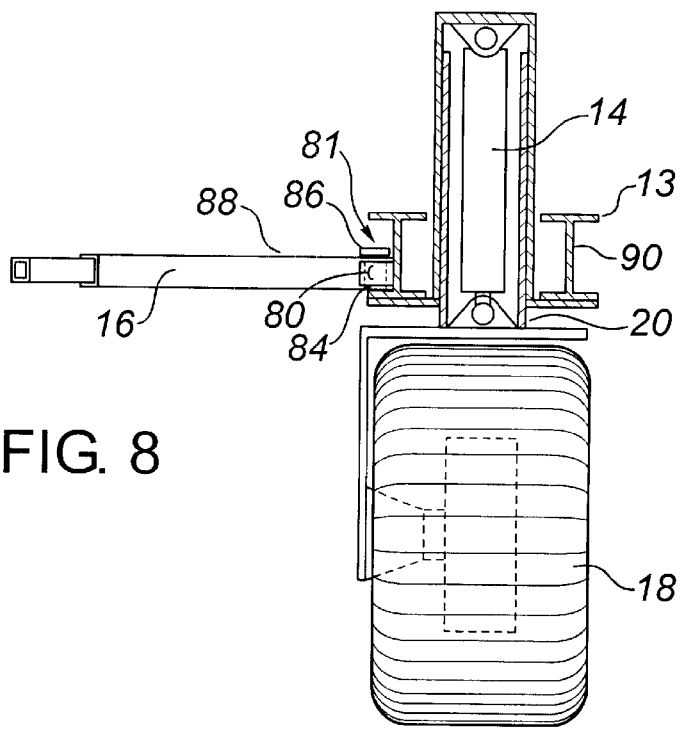
FIG. 8 is a front elevation view, in section, of one of the support wheels from the ground working apparatus illustrated in FIG. 3.
Figure 13:
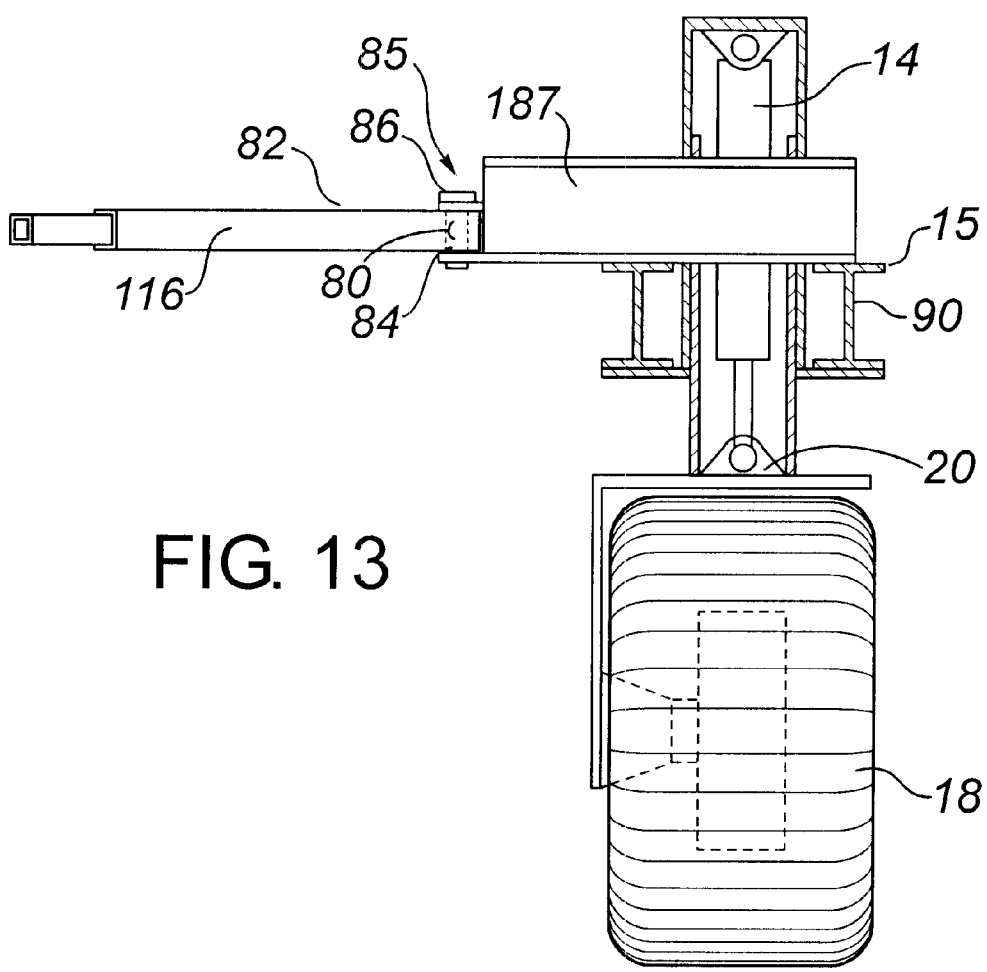
FIG. 13 is a front elevation view, in section, of one of the support wheels from the ground. working apparatus illustrated in FIG. 3.

Referring to FIG. 8, there is illustrated wheel support 14 and a pivotal connection 81 between first end 88 of first telescopically adjustable member 16 and first end 13 of main body 90. Pivotal connection 81 includes a pivot pin 86 which extends through an aperture 80 at first end 88 of first telescopically adjustable member 16 and then into a pivot pin receptacle 84. The pivotal connection between first end 82 of second telescopically adjustable-member 116 and second end of main body 15 could be made identical to that illustrated in FIG. 8, and it was originally intended that this be the case. During the course of construction of the proto-type unit, it was determined that having the pivot point too close to main body 90 restricted the ability to pivot to the transport position. Addressing this need resulted in some differences. Referring to FIG. 13, there is illustrated wheel support 14 and a pivotal connection 85 between first end 82 of second telescopically adjustable member 116 and second end 15 of main body 90. Pivotal connection 85 includes a pivot pin 86 which extends through an aperture 80 at first end 82 of second telescopically adjustable member and then into a pivot pin receptacle 84. This configuration differs from that illustrated in FIG. 8, as a horizontal extension 187 was added to move pivotal connection 85 away from main body 90. It was determined that this difference lead to better performance when pivoting into the transport position. It also provided for more clearance space for hydraulic components mounted in the area.

Figure 9:
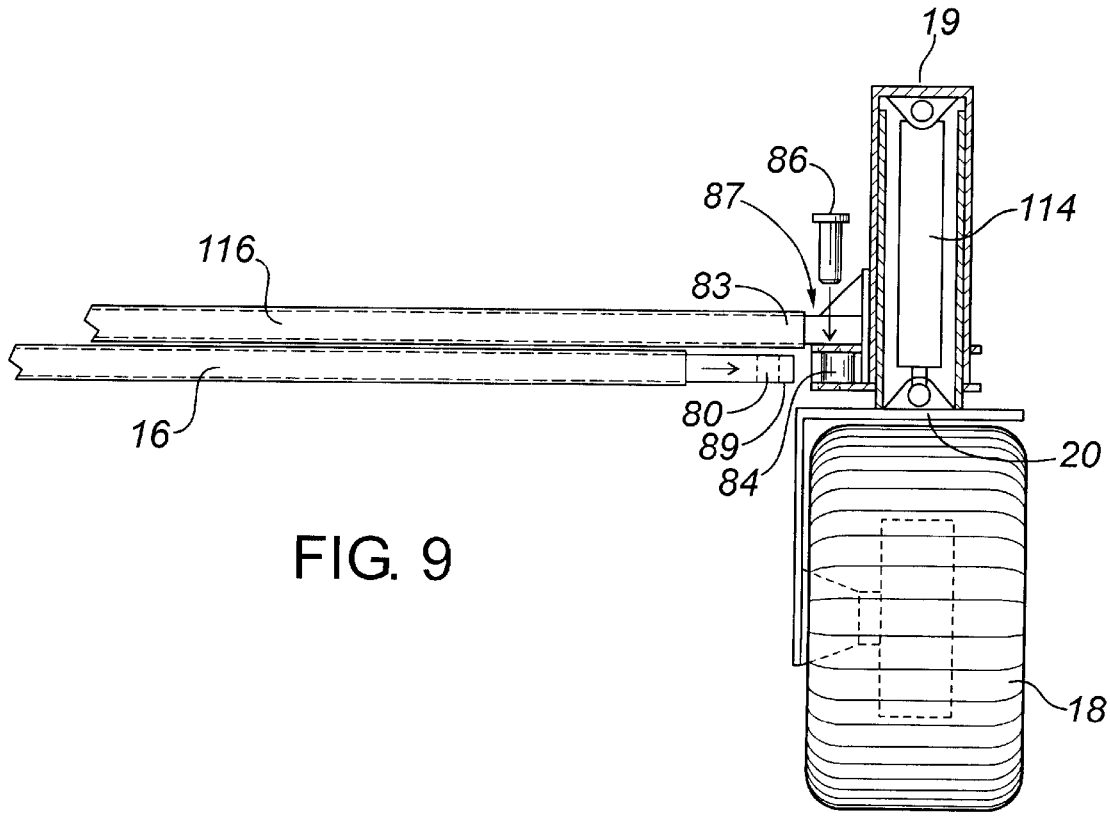
FIG. 9 is a front elevation view, in section, of another of the support wheels from the ground working apparatus illustrated in FIG. 3.

Referring to FIG. 9, there is illustrated movable apex 19 which includes wheel support 114. Second end 89 of first telescopically adjustable member 16 and second end 83 of second telescopically adjustable member 116 are both secured to wheel support 114. A pivotal connection 87 between second end 89 of first telescopically adjustable member 16 is illustrated. Pivotal connection 87 includes a pivot pin 86 which extends through an aperture 80 at second end 89 of first telescopically adjustable member 16 and then into a pivot pin receptacle 84. A pivotal connection between second end 83 of second telescopically adjustable member 116 and wheel support 114 is not illustrated, but is identical to that illustrated in FIG. 9.

Referring to FIG. 3, first and second telescopically adjustable members 16, 116 provide several operative positions with wheel support 114 on movable apex 19 spaced in different relationships to main body 90 and wheel supports 14. Referring to FIG. 7, first and second telescopically adjustable members 16, 116 provide a transport position in which wheel support 114 on movable apex 19 of chassis 12 is more closely spaced to main body 90. To adjust apparatus 10 into the transport position, pivot pin 86 is removed to release second end 89 of first telescopically adjustable member 16. First telescopically adjustable member 16 is then be pivoted to a position parallel to main body 90. Second telescopically adjustable member 116 is then extended by moving main body forward while applying the brakes to wheel 18 that is mounted on wheel support 114 of movable apex 19. As main body 90 moves forward, second telescopically adjustable member 116 pivots at first end 82 about pivotal connection 85 to move apex 19 closer to main body 90.

Figure 10:
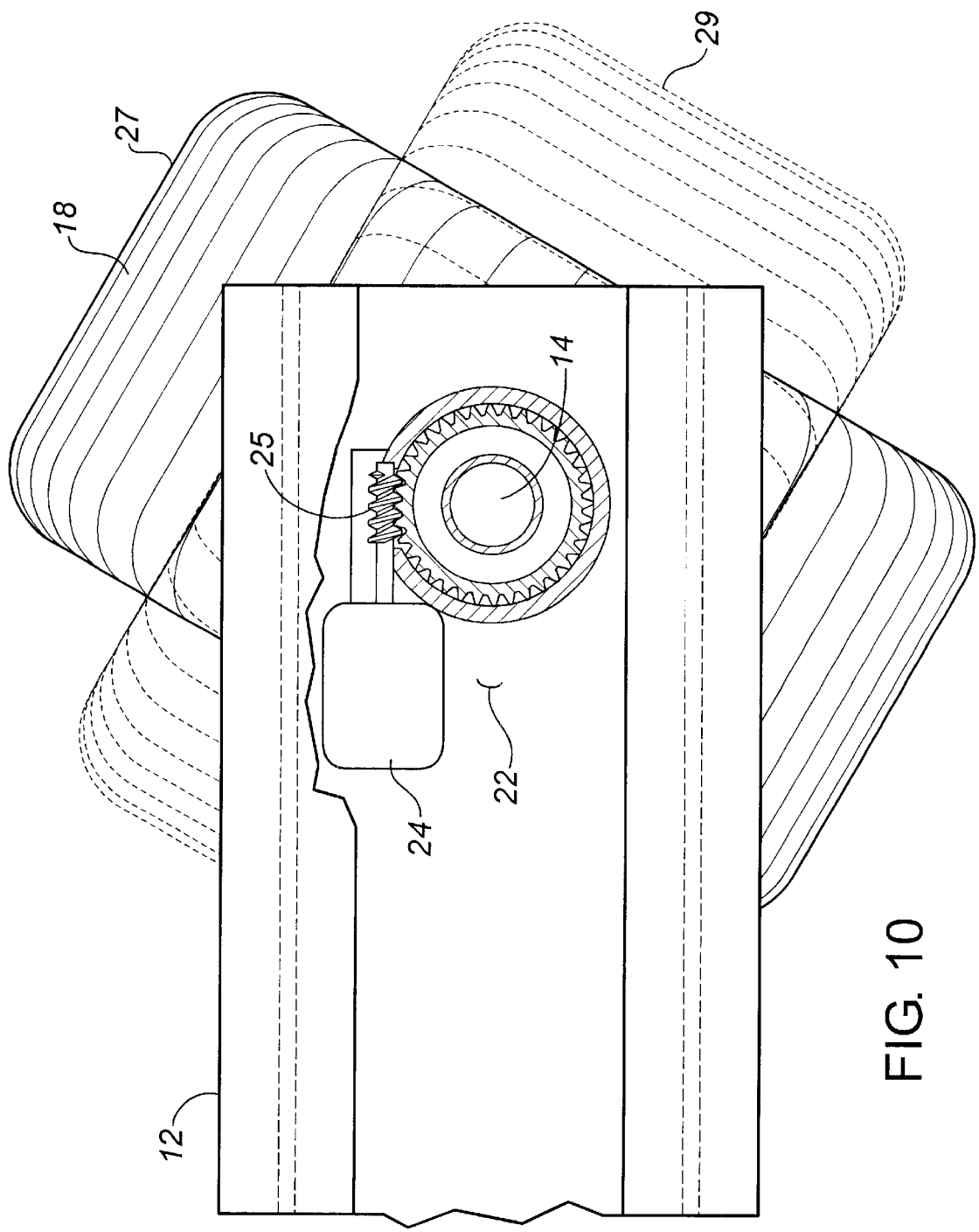
FIG. 10 is a top plan view of one of the support wheels from the ground working apparatus illustrated in FIG. 3, showing a steering control assembly.
Figure 14:
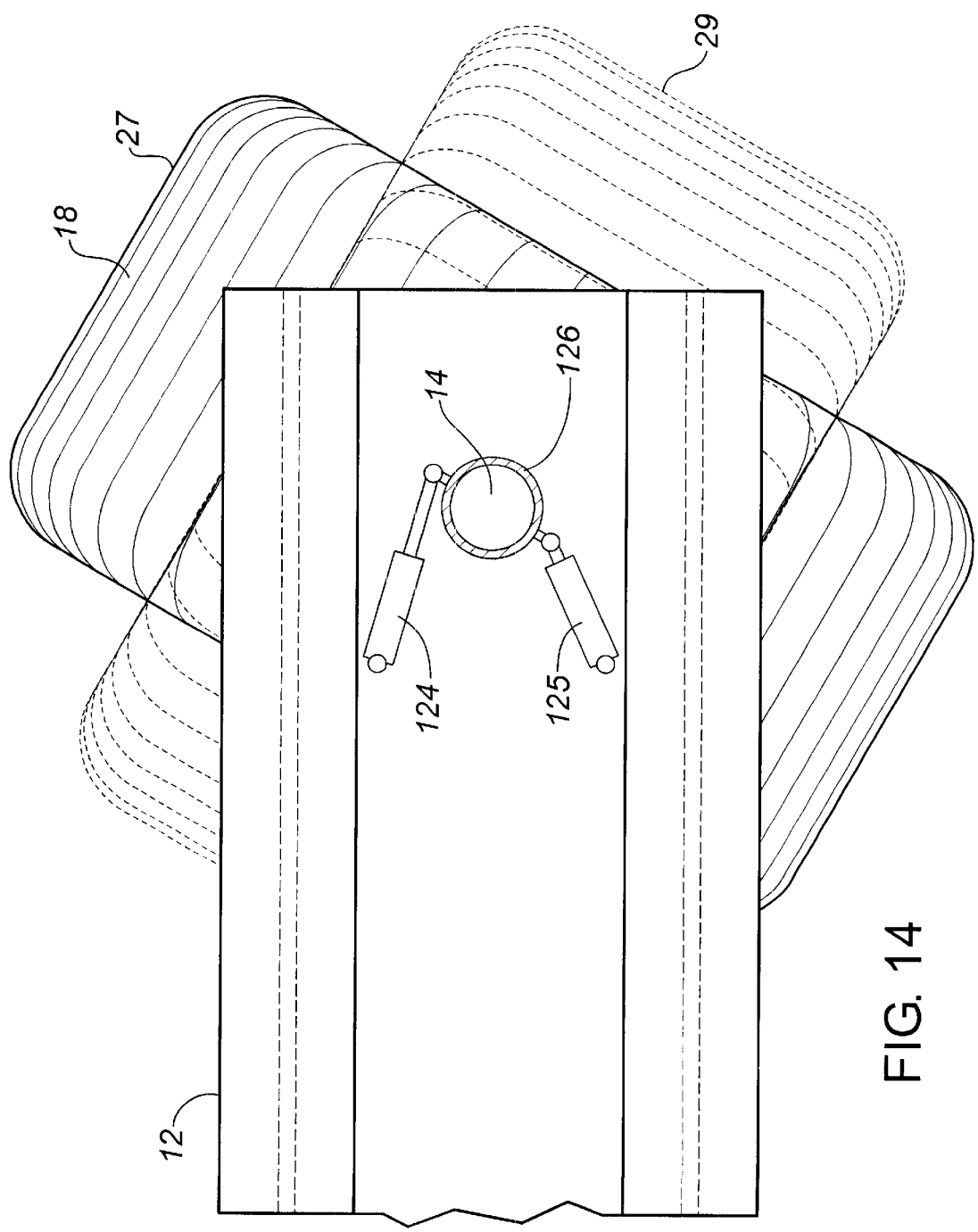
FIG. 14 is a top plan view of a steering control assembly for the support wheels of the ground working apparatus, which provides a first alternative to the steering control assembly illustrated in FIG. 10.
Figure 15:
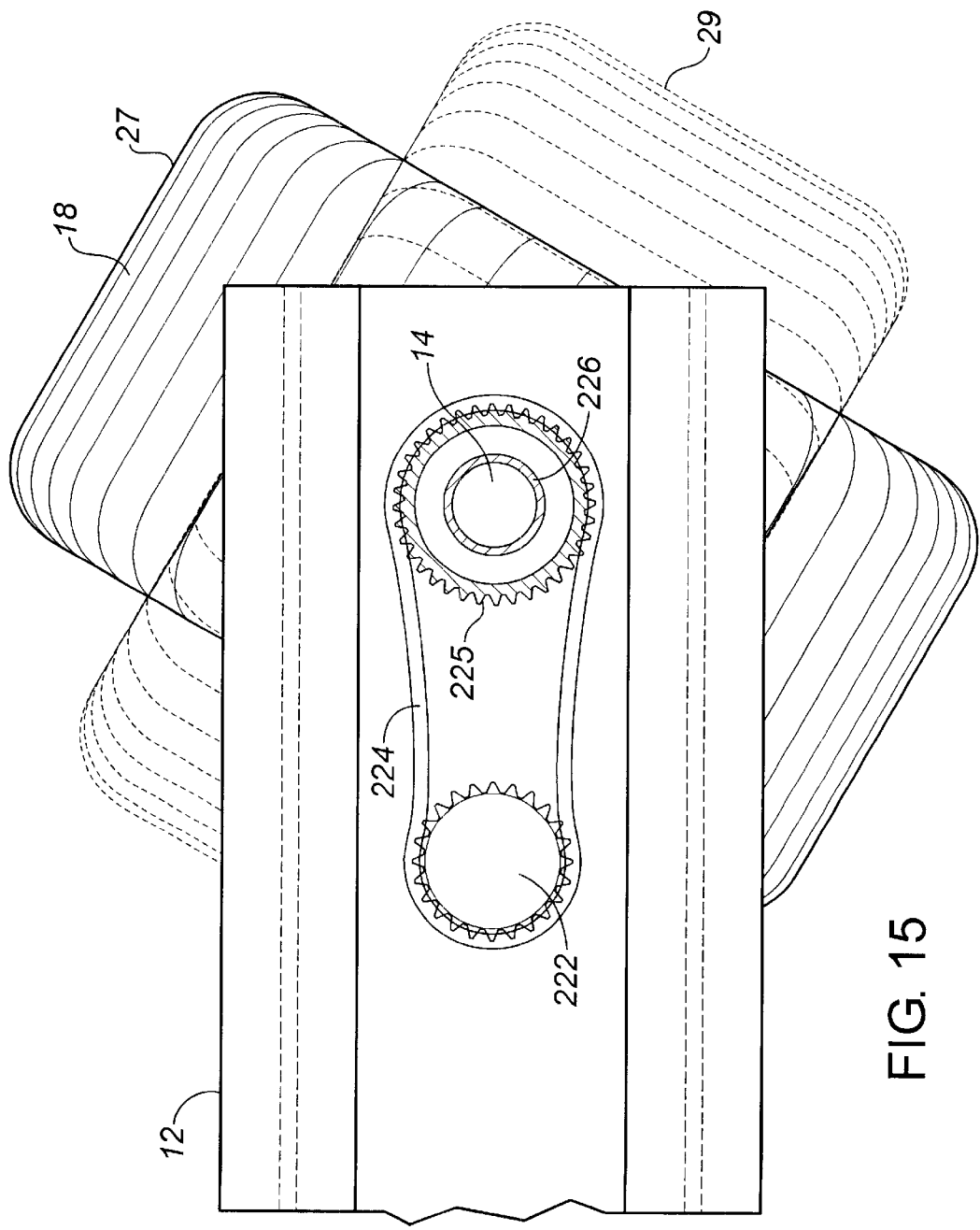
FIG. 15 is a top plan view of a steering control assembly for the support wheels of the ground working apparatus, which provides a second alternative to the steering control assembly illustrated in FIG. 10.

Referring to FIG. 10, each support wheel 18 has a drive motor 22 to rotate support wheel 18 in either a forward or reverse direction. Each support wheel 18 also has a steering motor 24 that powers a rack and pinion system 25 in either of a forward or a reverse direction to independently steer said support wheel 18. Each support wheel 18 is rotatable about a longitudinal axis of the corresponding wheel support 14 or 114, as illustrated by a first position indicated by solid lines 27 and a second position indicated by dashed lines 29. During the course of developing the proto-type, two alternative steering systems were developed, as illustrated in FIGS. 14 and 15. Referring to FIG. 14, a pair of hydraulic cylinders 124 and 125 were substituted for steering motor 24 and rack and pinion system 25. Hydraulic cylinders 124 and 125 were attached to opposed sides of a wheel support column 126. Upon hydraulic cylinder 124 being expanded and hydraulic cylinder 125 being contracted wheel support column 126 rotates to turn wheel 18 in a first direction. Conversely, upon hydraulic cylinder 125 being expanded and hydraulic cylinder 124 being contracted, wheel support column 126 rotates to turn wheel 18 in a second direction. This steering system was found to be effective, although the steering radius was necessarily limited by the stroke of hydraulic cylinders 124 and 125. It was determined that hydraulic cylinders 124 and 125 provided a 60 degree range of rotation; 30 degrees of rotation in either of the first direction or the second direction. This range of motion was found to be satisfactory for support wheels 18 at first end 13 and second end 15 of main body 90, but insufficient for support wheel 18 at apex 19. Referring to FIG. 15, a second alternative was developed-for use on support wheel 18 at apex. This alternative used a steering motor 222 with a steering gear 225 mounted on wheel. support column 226. The steering motor 222 was linked to steering gear 225 by a chain linkage 224. This alternative provided a 160 degree range of rotation; 80 degrees of rotation in either of the first direction or the second direction.

Figure 4:
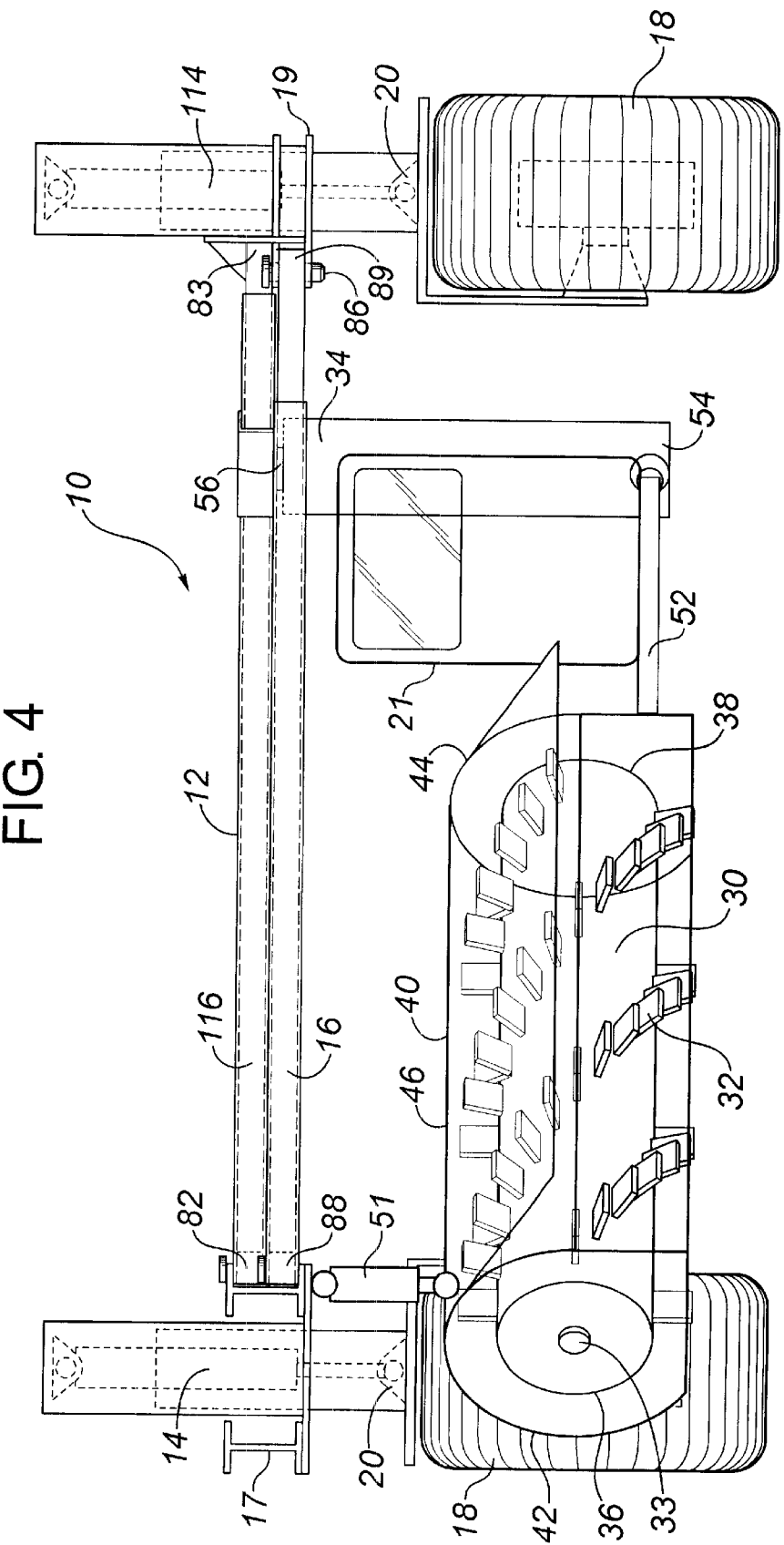
FIG. 4 is a front elevation view of the ground working apparatus illustrated in FIG. 3.
Figure 11:
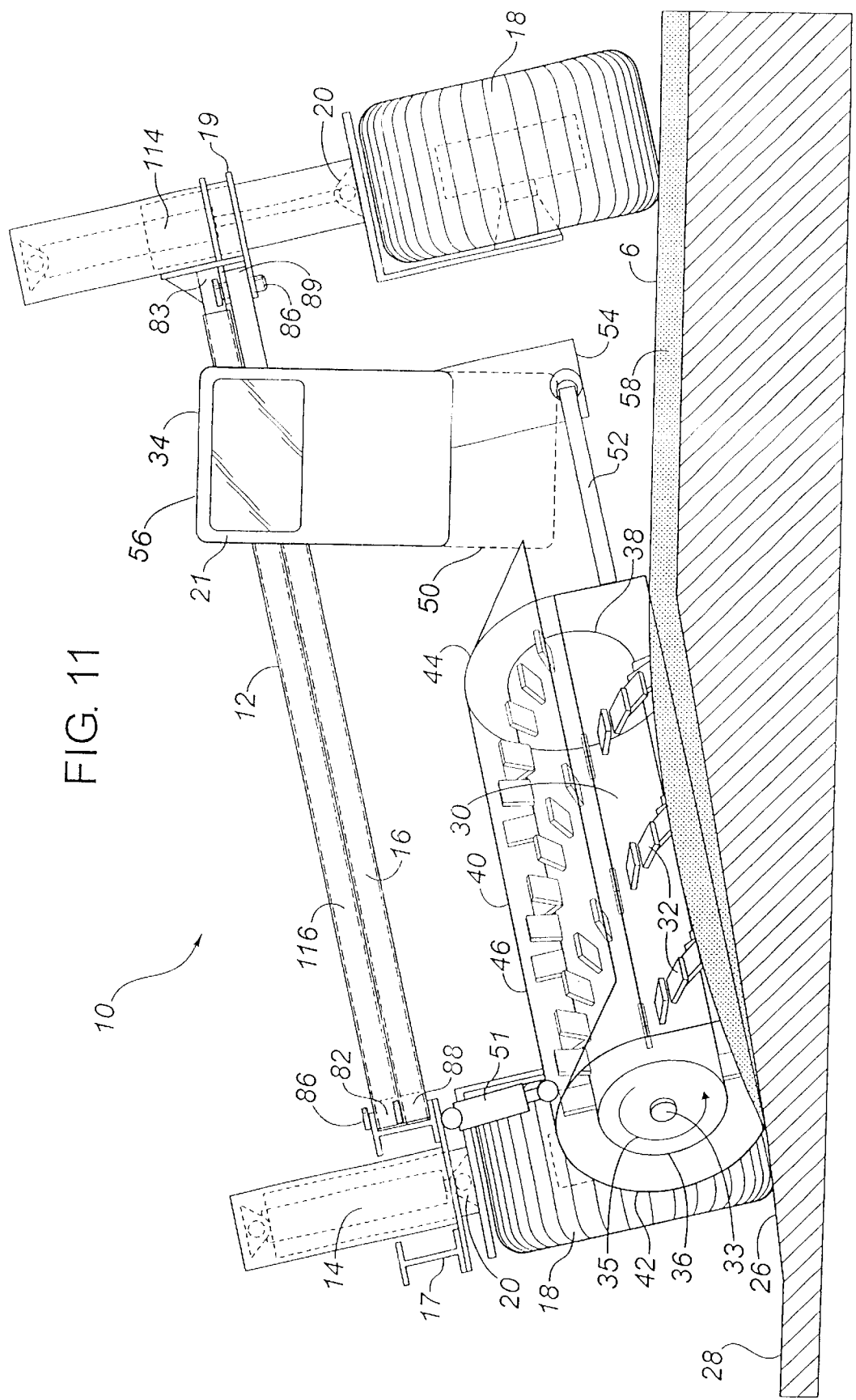
FIG. 11 is a front elevation view of the ground working apparatus illustrated in FIGS. 4 and 5, with cab elevated.
Figure 16:
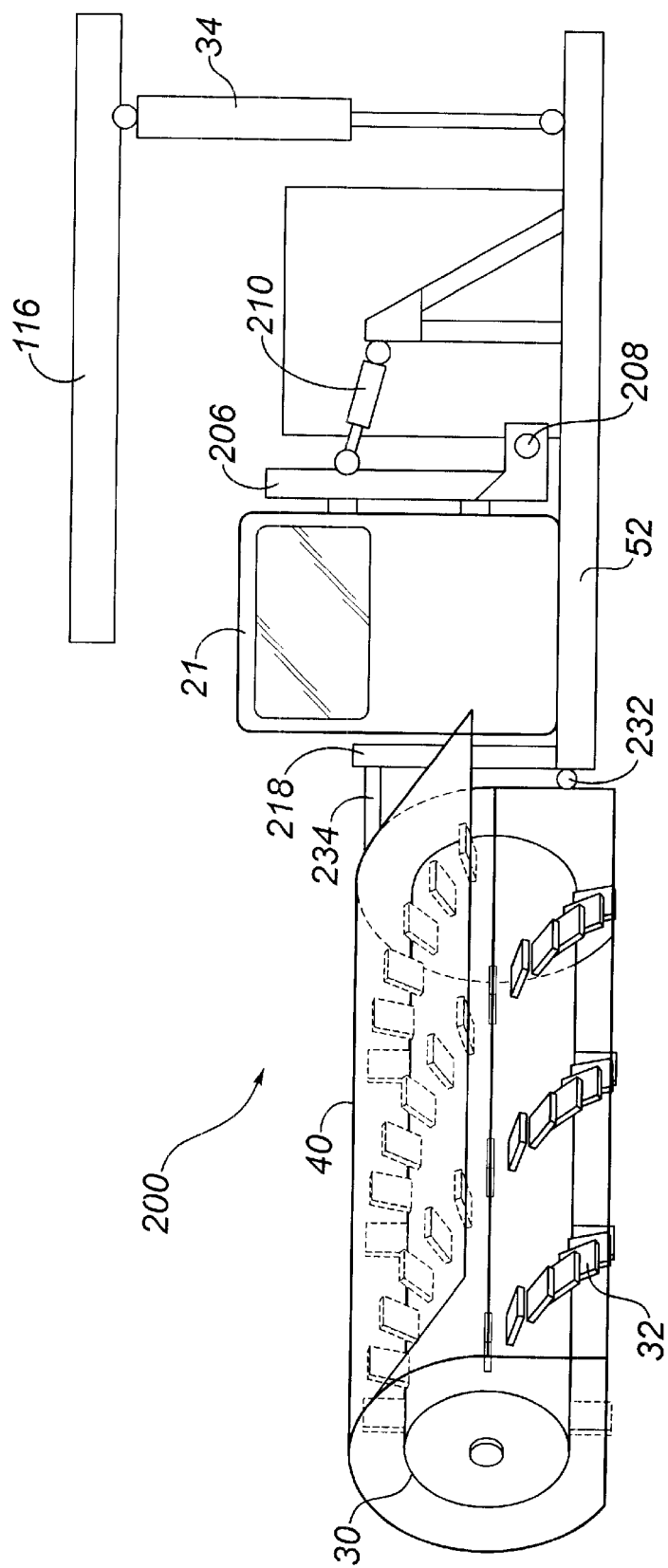
FIG. 16 is a side elevation view of a working assembly for the ground working apparatus illustrated in FIG. 3.
Figure 17:
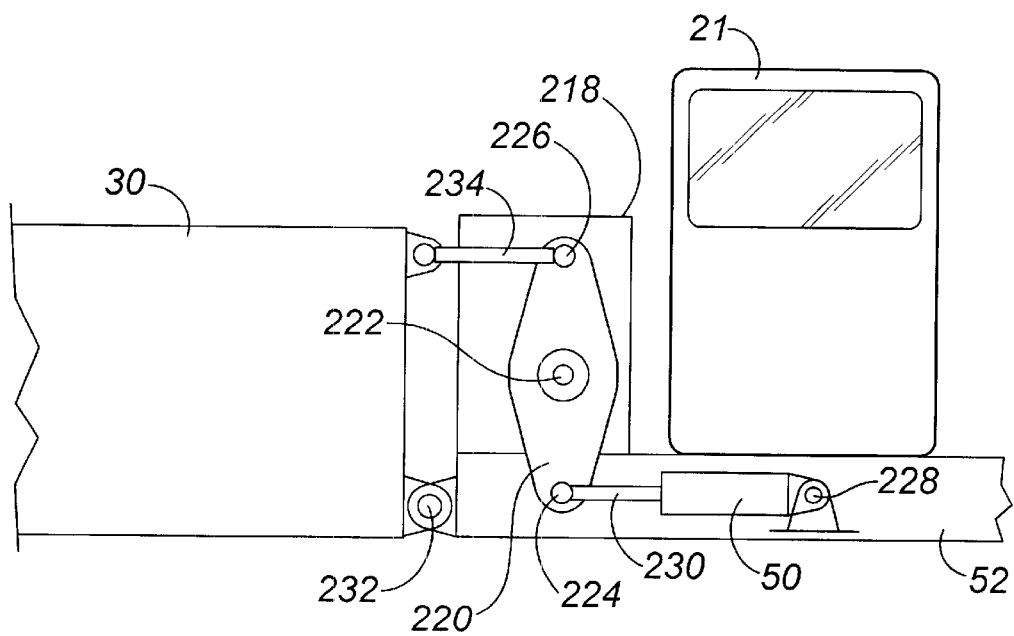
FIG. 17 is a detailed side elevation view of a drum orientation mechanism for the working assembly of the ground working apparatus illustrated in FIG. 16.
Figure 18:
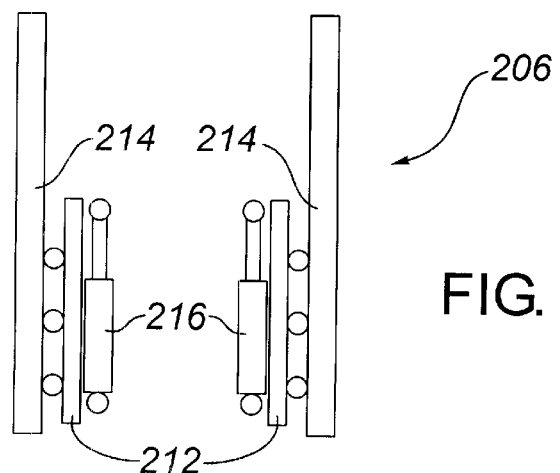
FIG. 18 is a detailed side elevation view of a cap elevation mechanism for the working assembly of the ground working apparatus illustrated in FIG. 16.
Figure 19:
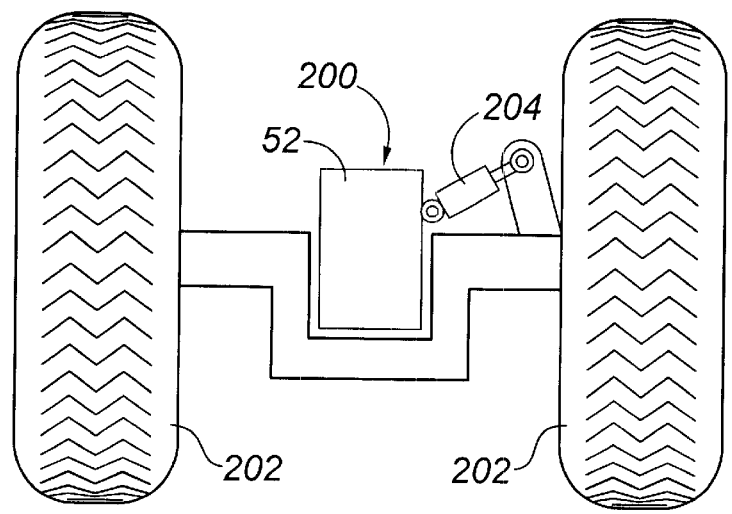
FIG. 19 is a detailed end elevation view of underlying support wheels for the working assembly of the ground working apparatus illustrated in FIG. 16.
Figure 20:
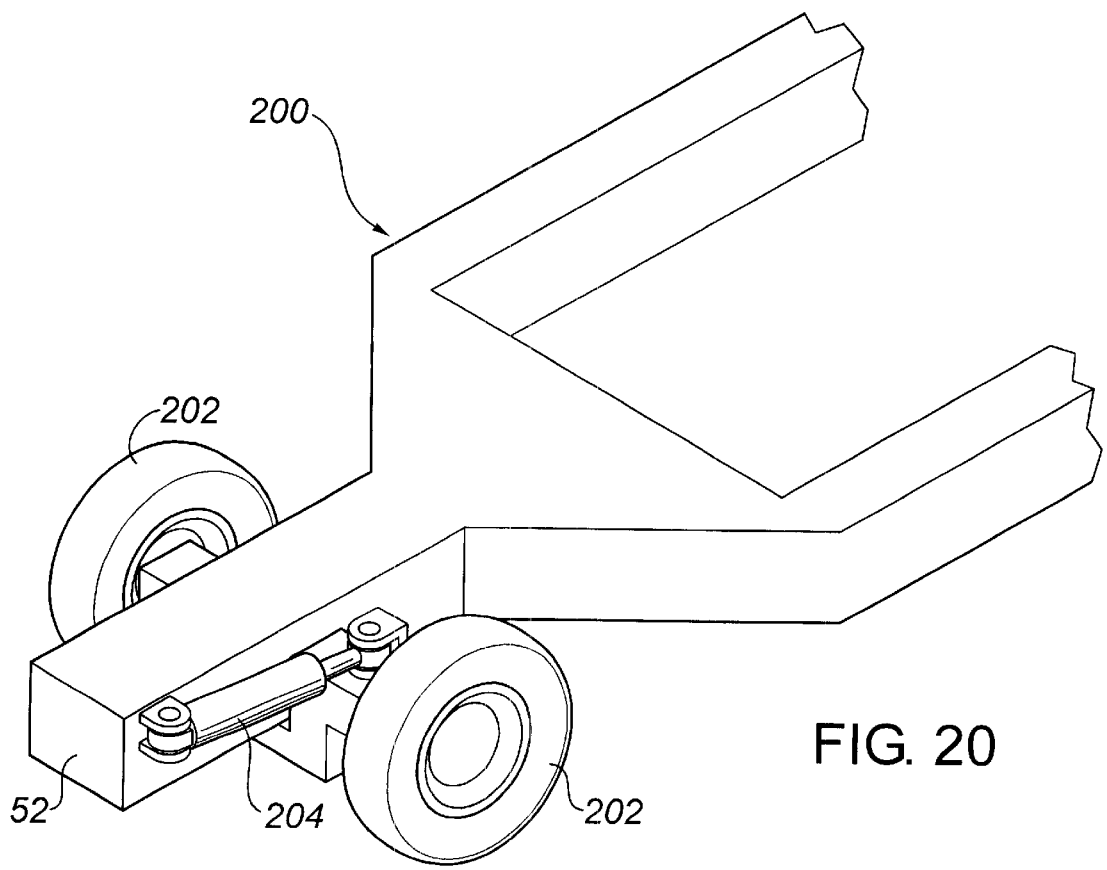
FIG. 20 is a perspective view of the underlying support wheel for the working assembly of the ground working apparatus illustrated in FIG. 16.

Referring to FIG. 3, chassis 12 supports a working assembly, generally indicated by reference numeral 200. Working assembly 200 includes a cab 21 and a rotatably mounted drum 30. Working assembly 200 includes a support platform 52 which is suspended in a substantially horizontal orientation from second telescopically adjustable member 116 of chassis 12 by hydraulic cylinder 34. Hydraulic cylinder 34 can be used to raise and lower support platform 52. Working assembly 200 is illustrated in more detail in FIG. 16. Referring to FIGS. 19 and 20, it was determined during construction of the proto-type that having working assembly 200 suspended solely from hydraulic cylinder 34 put undue stress on pivotal connection 56 where hydraulic cylinder 34 connects to chassis 12. For that reason, underlying support wheels 202 have been provided for support platform 52. The positioning of support wheels 202 can be altered by hydraulic cylinders 204 which enable support wheels 202 to be steered. Referring to FIG. 16, An operator operates all powered components of apparatus 10 from a cab 21. Cab 21 is capable of several movements. Cab 21 can be titled to place the operator at an orientation that corresponds to the angle of the groundsurface. This feature is desirable as apparatus 10 was primarily developed for use in uneven terrain, such as drainage ditches. Cab 21 can also be raised and lowered as illustrated in FIGS. 4 and 11. The reason for raising cab 21 is to raise the operator above any dust cloud that may be produced in order to increase visibility during operation. In addition, cab 21 may need to be raised in order to provide clearance. Cab 21 will have to be lowered for better operator access to enter and exit from cab 21. Referring to FIG. 16, cab 21 is attached to a lift assembly 206 similar to that found on a fork lift. Lift assembly 206 is pivotally mounted to support platform 52 by a pivotal connection 208. This enables lift assembly 206 to pivot about pivotal connection 208 to alter the angular orientation of cab 21. Pivotal movement of lift assembly 206 about pivotal connection 208 is performed by hydraulic cylinder 210. Referring to FIG. 18, lift assembly 206 has a pair of cab engaging supports 212 which move along tracks 214. Supports 212 are used to secure cab 21 to lift assembly 206. Hydraulic cylinders 216 are used to move supports 212 along tracks 214 in order to raise or lower cab 21. Referring to FIG. 17, when the proto-type was built it was determined that there was a need have greater control over drum 30, than the use of a single hydraulic cylinder 50 would provide. A support 218 was mounted on support platform. 52 to support a pivot linkage 220 that pivoted about a pivotal connection 222. Pivot linkage 220 has two opposed connection points 224 and 226. One end 228 of hydraulic cylinder 50 was secured to support platform 52, the other end 230 of hydraulic cylinder 50 was secured to connection point 224 of pivot linkage 220. Drum 30 was attached by a pivotal connection 232 to support platform 52. A connecting member 234 was extended from drum 30 to connection point 226 of pivot linkage 220. As hydraulic cylinder 50 is extended pivot linkage 220 pivots about pivotal connection 222. This causes connection point 226 to which connecting member 234 is attached to exert a force upon drum 30 which pivots drum 30 about pivotal connection 232 to an angular orientation.

Figure 12:
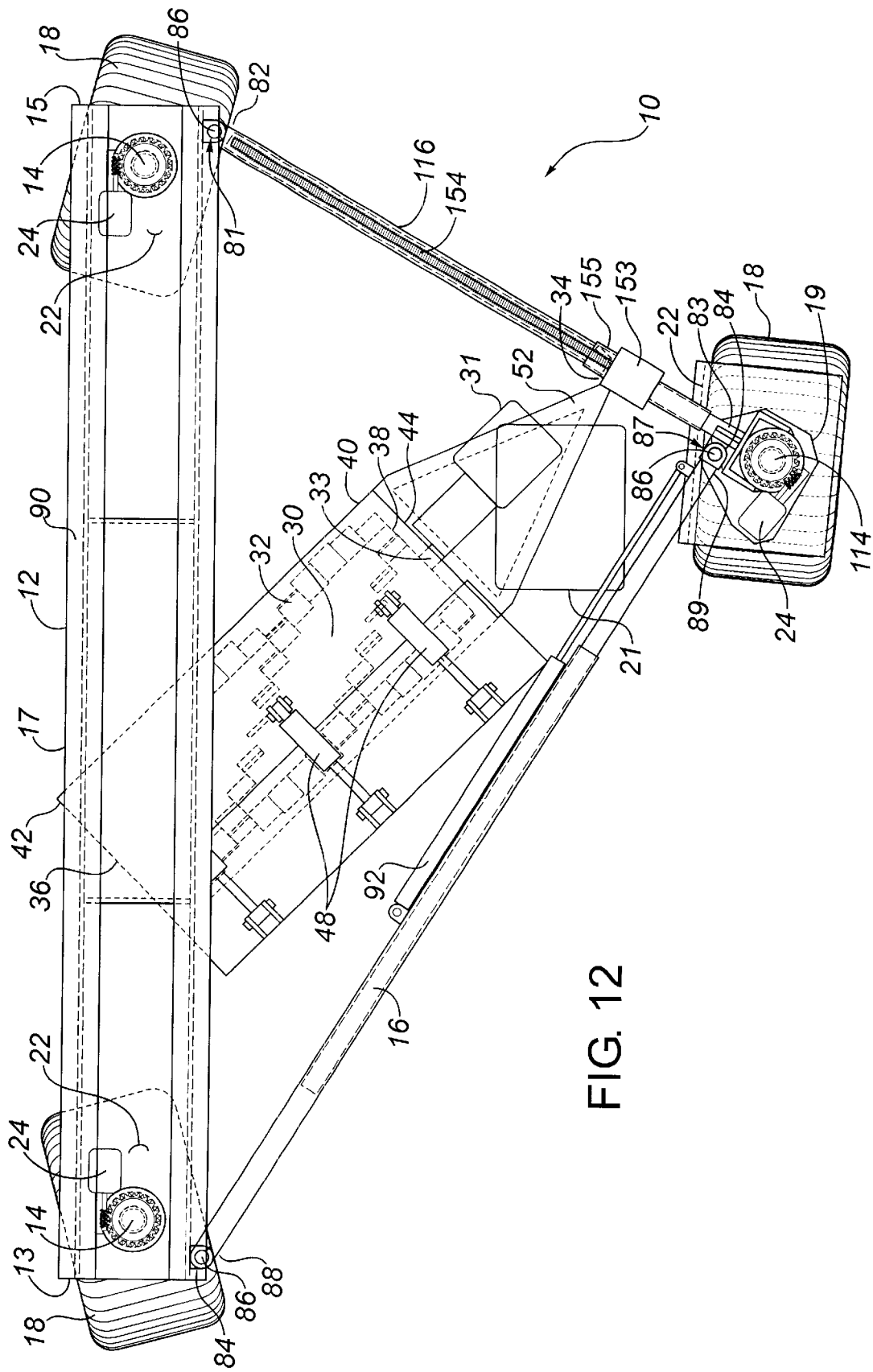
FIG. 12 is a top plan view of the ground working apparatus illustrated in FIG. 3, with alternative means for adjusting the length of the second telescopic member.

Referring to FIG. 12, a drive screw 154 was mounted along second telescopically adjustable member 116. A trolley fixture 155 was provided which travelled along drive screw 154. Pivotal connection 56 for hydraulic cylinder 34 from which working assembly 200 is supported was attached to trolley fixture 155. This allows the positioning of working assembly 200 along second telescopically adjustable member 116 to be adjusted. When drive screw 154 rotates in a first rotational direction trolley fixture 155 travels in a first direction along second telescopically adjustable member 116. When drive screw 154 is rotated in a second rotational direction trolley fixture travels in a second direction along second telescopically adjustable member 116. An actuating drive motor 153 was provided for rotating drive screw 154 in either the first rotational direction or the second rotational direction, as desired.

Figure 5:
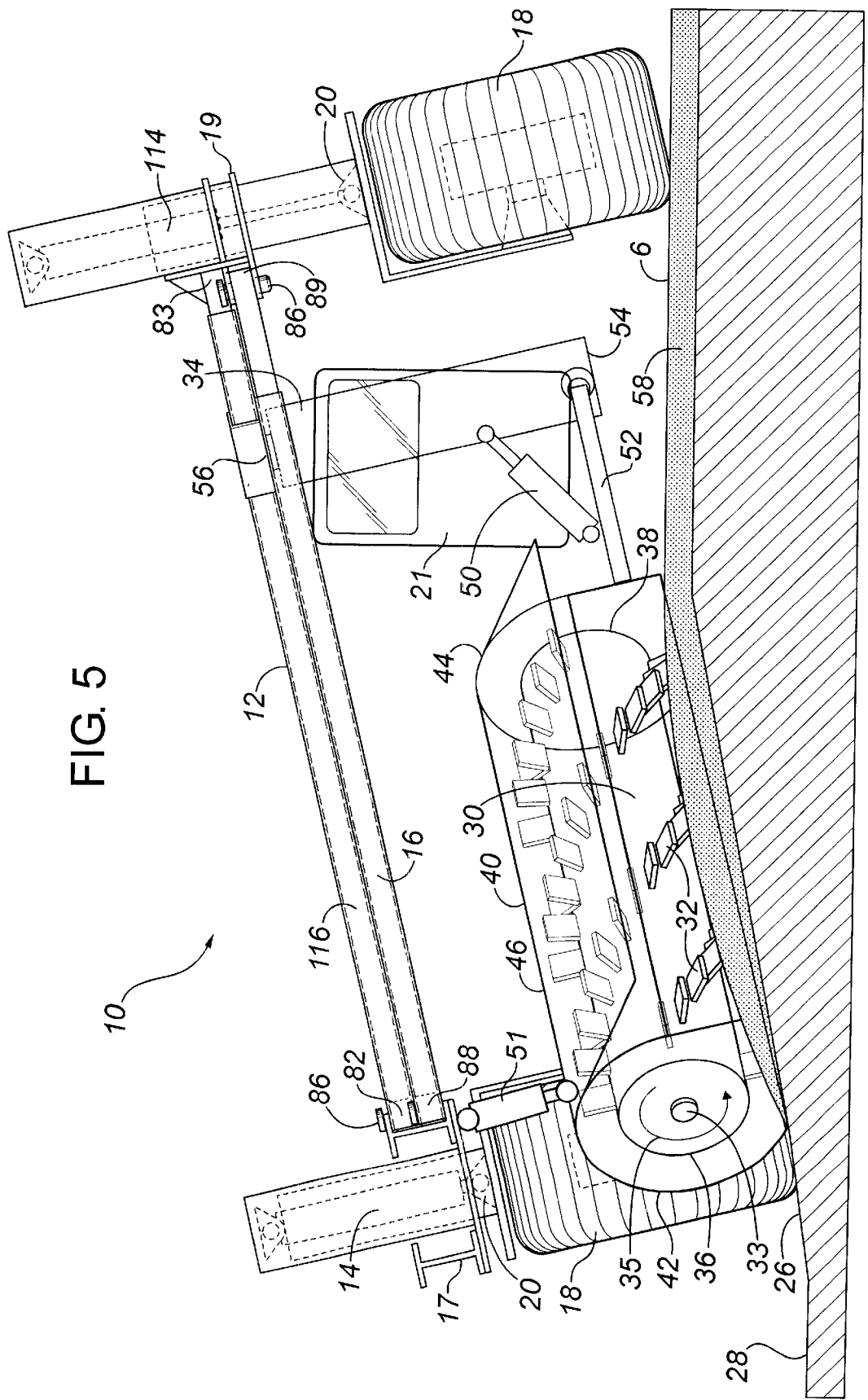
FIG. 5 is a front elevation view of the ground working apparatus illustrated in FIG. 4, being used to groom a ditch in a first angular orientation.
Figure 6:
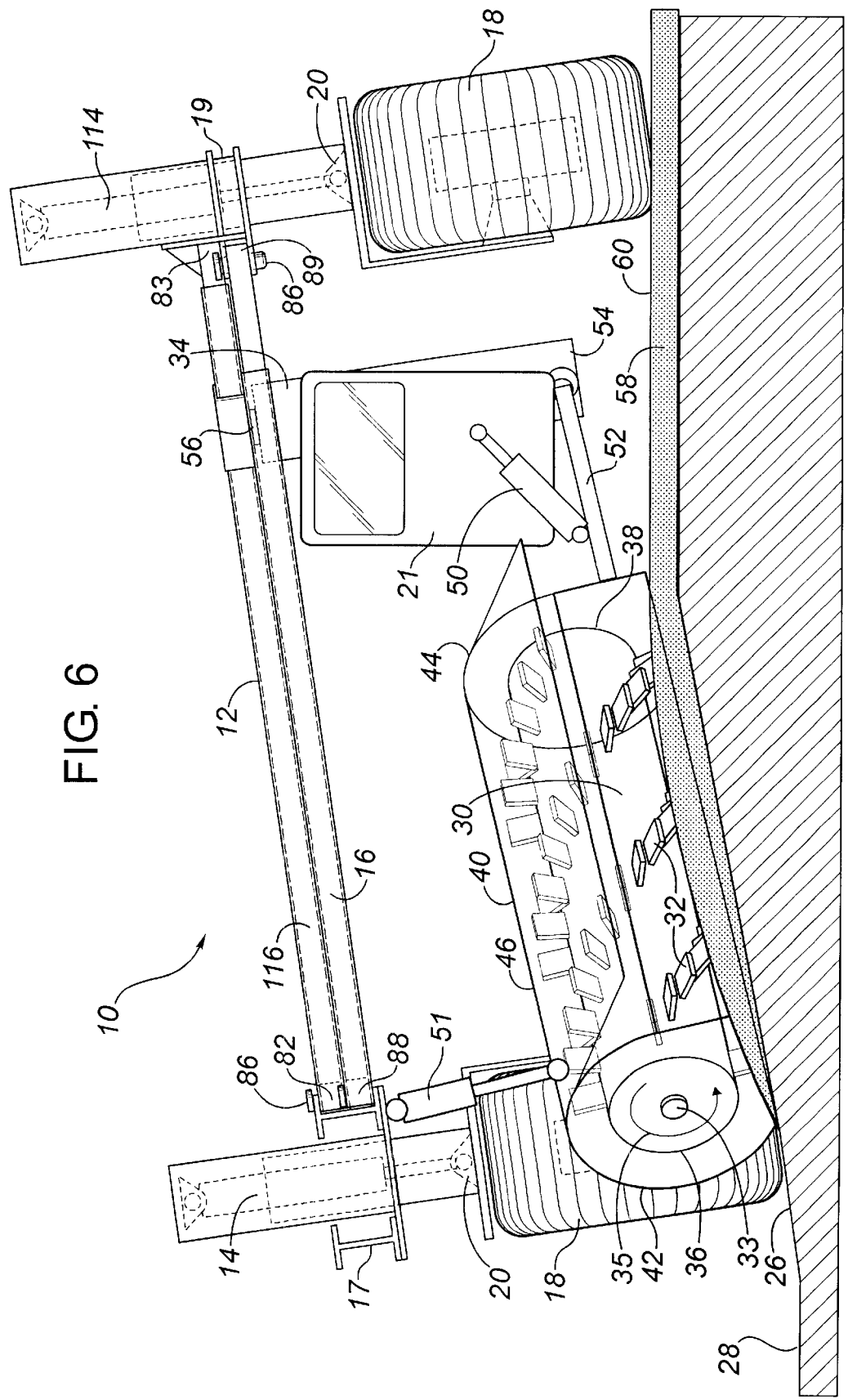
FIG. 6 is a front elevation view of the ground working apparatus illustrated in FIG. 4, being used to groom a ditch in a second angular orientation.

Referring to FIGS. 5 and 6, telescopically extendible wheel supports 14 provide a means whereby the height and angular orientation of chassis 12 is adjustable to suit a contour 26 of a ditch 28. This ensures sufficient clearance can be provided for working assembly 200.

Referring to FIG. 3, rotation of drum 30 about an axle 33 is powered by a motor 31. Drum 30 has a first end 36 and a second end 38. Referring to FIGS. 5 and 6, when drum 30 rotates about axle 33 in the direction indicated by curved arrow 35, radially projecting teeth 32 broadcast gravel 58 from ditch 28. Referring to FIG. 3, a shield 40 overlies drum 30. Shield 40 has a first end 42, a second end 44 and an upper side 46. An angular orientation of shield 40 relative to drum 30 is adjustable by means of telescopic cylinders 48. Referring to FIG. 6, a distance that gravel 58 and debris is broadcast from ditch 28 toward road surface 60 by drum 30 is controlled by angular orientation of shield 40.

Figure 2:
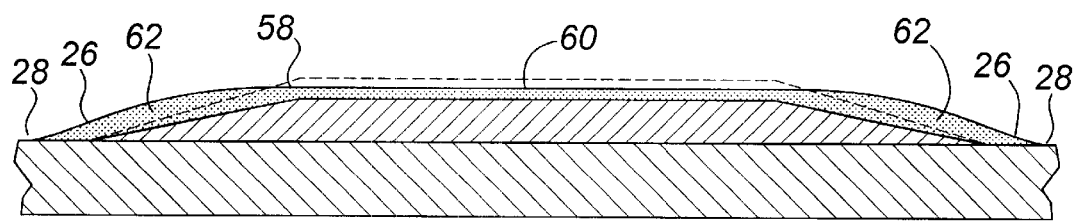
FIG. 2 is an end elevation view, in section of the gravel road illustrated in FIG. 1, after prolonged use by vehicular traffic.

The use and operation of apparatus 10 will now be described in relation to the preferred method and with reference to FIGS. 1 through 20. Referring to FIG. 1 there is illustrated a road 60 that is covered with gravel 58. Referring to FIG. 2, over time gravel 58 is moved toward ditch 28 and accumulates as deposits 62 altering contour 26 of ditch 28. Apparatus 10 is transported to a selected site requiring removal of gravel from a ditch, as illustrated in FIG. 2. Apparatus 10 is transported in the transport position illustrated in FIG. 7. Apparatus 10 is adjusted to the operating position illustrated in FIG. 3. The length of second telescopically adjustable member 116 is shortened by applying brakes on wheel 18 of wheel mounting 114 of movable apex 19 and backing up main body 90. Second telescopically adjustable member 116 is then locked in a selected telescopic position. Second end 89 of first telescopically adjustable member 16 is connected to wheel mounting 114 of movable apex 19. A length of first telescopically adjustable member 16 can then be expanded in one of two ways. One way is by expanding hydraulic piston 92 to assume an operative position. Another way is by driving and steering support wheel 18 mounted to apex 19. Referring to FIGS. 5 and 6, apparatus 10 is positioned with at least one support wheel 18 in ditch 28 and the other support wheels on road surface 60. In order to assume such a position wheel supports 14 and 114 must be telescopically adjusted to accommodate the contours of the ditch and provide clearance for working assembly 200. Apparatus 10 is then driven slowly along ditch 28 broadcasting gravel 58 from ditch 28 onto road surface 60 with drum 30, to restore contours 26 of road surface 60 from the state illustrated in FIG. 2 to that illustrated in FIG. 1. Referring to FIG. 12, the positioning of working assembly 200 along second telescopically adjustable member 116 is adjusted, as required, by activating drive motor 153 to rotate drive screw 154. This moves trolley fixture 155 to from which working assembly 200 is suspended along second telescopically adjustable member 116. Referring to FIGS. 19 and 20, as working assembly 200 moves along the ditch, a portion of the weight of working assembly 200 is borne by underlying support wheels 189 to avoid potential strain upon pivotal connection 56. Referring to FIG. 17, drum 30 is angularly adjusted by activating hydraulic cylinder 50 to alter the position of pivot linkage 220. This causes pivot linkage 220 to pivot about pivotal connection 222 and causes connecting member 234 to exert a force changing the angular orientation of drum 30. Cab 21 can be raised to the position illustrated in FIG. 11 when required to enable the operator to look over top of any clouds of dust. Referring to FIGS. 16 and 18, cab 21 is raised by activating hydraulic cylinders 216 to move cab supports 212 along tracks 214 of lift assembly 206. in order to raise or lower cab 21. Referring to FIG. 16, the orientation of cab 21 altered to match the ground surface over which apparatus 10 is travelling by activating hydraulic cylinder 210 to pivot lift assembly 206 about pivotal connection 208. The distance that gravel 58 is broadcast from ditch 28 toward road surface 60 by drum 30 is controlled by telescopic cylinders 48 which adjust the angular orientation of shield 40 to alter the trajectory of gravel 58.

Although apparatus 10 was developed to groom ditches, it is capable of serving other contouring functions along with a plurality of other ground working functions. These other ground working functions include, but are not limited to, soil aeration, soil mixing, and top soil removal. The proto-type machine had the ability to remove topsoil at a controlled and variable depth. This served to save farmland when excavations were necessary for the installation of pipelines. The topsoil was not only separated from the subsoil, but the topsoil was pulverized in the process. This made it easier to replace the topsoil immediately upon burial of the pipe. Pipeline contractors found this beneficial, as the land was left in a finished condition available for the farmer to enter upon the land. Previously, the topsoil was left in lumps. A further step was needed in the spring to break up the lumps and level the land. This follow up step was not necessary with the proto-type machine.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for ground working, comprising:

a chassis;

three telescopically extendible wheel supports secured to the chassis;

the chassis includes telescopically adjustable members extending between at least two of the wheel supports, whereby the distance between the support wheels is adjustable, the telescopically adjustable members providing at least one operative position with the three support wheels in spaced apart relation and a transport position in which at least two of the three support wheels are more closely spaced;

a support wheel rotatably mounted to a remote end of each of the telescopically extendible wheel supports, each support wheel having a drive motor to rotate the support wheel and a steering motor to independently steer the support wheel;

the telescopically extendible wheel supports providing a means whereby the height and angular orientation of the chassis is adjustable to suit a contour of a ditch;

a rotatably mounted drum secured to and underlying the chassis, the drum having radially projecting teeth and being angularly adjustable; and a shield overlying the drum, the shield being angularly adjustable, thereby adjusting the distance that gravel and debris is broadcast by the rotating drum.

2. A method for ground working, comprising the steps of:

firstly, providing an apparatus for ground working, comprising:

a chassis;

at least three telescopically extendible wheel supports secured to the chassis;

at least one support wheel rotatably mounted to a remote end of each of the telescopically extendible wheel supports;

the telescopically extendible wheel supports providing a means whereby the height and angular orientation of the chassis is adjustable to suit a contour of a ditch; and a rotatably mounted drum secured to and underlying the chassis;

secondly, positioning the apparatus with at least one support wheel in the ditch and at least one support wheel on a road;

thirdly, driving along the ditch broadcasting gravel from the ditch onto the road with the rotating drum.

* * * * *